United States Patent
Van Der Burg et al.

(10) Patent No.: US 8,587,161 B2
(45) Date of Patent: Nov. 19, 2013

(54) MOVING DEVICE AS WELL AS A COMPONENT PLACEMENT DEVICE PROVIDED WITH SUCH A MOVING DEVICE

(75) Inventors: Richard Adrianus Johannes Van Der Burg, Eindhoven (NL); Elena Andreevna Lomonova, Eindhoven (NL); Koen Joseph Meessen, Eindhoven (NL); Johannes Jacobus Hubertus Paulides, Waalwijk (NL)

(73) Assignee: Assembleon B.V., Veldhoven (NL)

( * ) Notice: Subject to any disclaimer, the term of this patent is extended or adjusted under 35 U.S.C. 154(b) by 346 days.

(21) Appl. No.: 13/024,234

(22) Filed: Feb. 9, 2011

(65) Prior Publication Data

US 2011/0194923 A1    Aug. 11, 2011

(30) Foreign Application Priority Data

Feb. 11, 2010  (NL) .................................... 2004226

(51) Int. Cl.
  *H02K 41/03*  (2006.01)
(52) U.S. Cl.
  USPC ................... 310/12.07; 310/12.21; 310/12.31
(58) Field of Classification Search
  USPC ................... 310/12.07, 12.21, 12.31, 156.08, 310/156.43, 261.1; 414/752.1; 355/53, 72
  See application file for complete search history.

(56) References Cited

U.S. PATENT DOCUMENTS

| 4,654,571 | A  | * | 3/1987  | Hinds ........................ 318/687 |
| 5,982,053 | A  |   | 11/1999 | Chitayat |
| 6,097,114 | A  | * | 8/2000  | Hazelton .................... 310/12.06 |
| 6,998,737 | B2 | * | 2/2006  | De Weerdt ................. 310/12.07 |
| 7,245,047 | B2 | * | 7/2007  | Vreugdewater et al. ... 310/12.07 |
| RE41,232  | E  | * | 4/2010  | Hazelton et al. ........... 310/12.06 |
| 7,737,419 | B2 | * | 6/2010  | Asano ........................ 250/492.2 |
| 2004/0041479 | A1 | * | 3/2004  | French ....................... 310/105 |
| 2004/0263000 | A1 | * | 12/2004 | Vreugdewater et al. ........ 310/12 |
| 2005/0077786 | A1 |   | 4/2005  | De Weerdt |
| 2008/0067415 | A1 | * | 3/2008  | Asano ..................... 250/440.11 |

FOREIGN PATENT DOCUMENTS

EP     2 037 555 A2    3/2009

OTHER PUBLICATIONS

Search Report and Written Opinion cited in related Patent Application No. NL 2004226, dated Oct. 13, 2010.

* cited by examiner

*Primary Examiner* — Tran Nguyen
(74) *Attorney, Agent, or Firm* — Foley & Lardner LLP

(57) ABSTRACT

A moving device comprises at least a first element provided with main magnets and a second element provided with coils. The main magnets are arranged in a grid of rows and columns, wherein main magnets in adjacent rows are oppositely polarised and staggered relative to each other. The coils can be energized for moving the first element relative to the second element in a direction parallel to the rows as well as in a direction parallel to the columns. Auxiliary magnets of the same polarity are disposed between the main magnets at least in a number of rows, wherein the strength of the magnetic field of said auxiliary magnets is different from that of the main magnets.

9 Claims, 5 Drawing Sheets

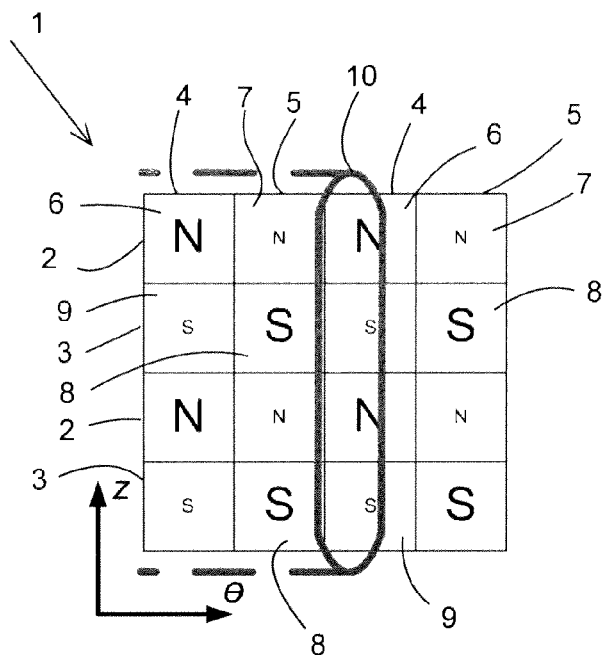
Fig. 1A
Fig. 1B
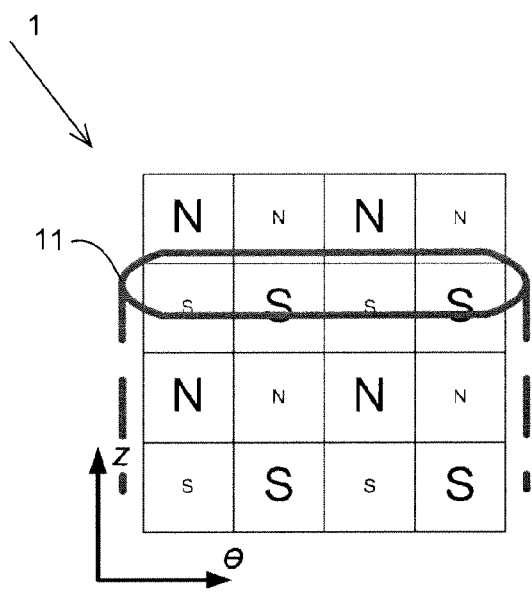
Fig. 2A
Fig. 2B

MOVING DEVICE AS WELL AS A COMPONENT PLACEMENT DEVICE PROVIDED WITH SUCH A MOVING DEVICE

The invention relates to a moving device comprising at least a first element provided with main magnets and auxiliary magnets and a second element provided with coils, which main magnets are arranged in a grid of rows and columns, wherein at least main magnets in adjacent rows are oppositely polarised and staggered relative to each other, whilst auxiliary magnets of the same polarity are disposed between the main magnets at least in a number of rows, wherein the strength of the magnetic field of said auxiliary magnets is different from that of the main magnets, wherein the coils can be energized for moving the first element relative to the second element in a direction parallel to the rows as well as in a direction parallel to the columns.

The invention also relates to a component placement device provided with such a moving device.

In such a device, which is known from US 2005/077786 A1, main magnets and auxiliary magnets are arranged in x,y grids. Because of the presence of the auxiliary magnets arranged in rows, the change in the magnetic field across the various rows is different from that across the various columns, so that the magnetic forces that occur upon movement in a direction parallel to the rows as a result of the energisation of the coils are different from the magnetic forces that occur upon movement in a direction parallel to the columns.

A drawback of the known device is that the grid structure is relatively complex, so that the production of such grids is relatively complicated and costly.

It is an object of the invention to provide a moving device which has a relatively simple grid structure and by means of which it is readily possible to realise a change in the magnetic field across the various rows different from that across the various columns.

This object is accomplished with the moving device according to the invention in that the first element is provided with a number of disc-shaped magnetic segments and permanent magnets disposed between the segments, wherein permanent magnets located adjacent to each other are oppositely polarised in a direction parallel to the columns, whilst the segments form the main magnets and the auxiliary magnets.

The auxiliary magnets may be provided between the main magnets only in rows having one polarisation direction, whereas no auxiliary magnets are provided in the rows having the other polarisation direction.

Preferably, however, auxiliary magnets are disposed between the main magnets in all the rows, which auxiliary magnets all have the same polarity as the main magnets and a weaker magnetic field than the main magnets in the row in question. Because of this arrangement of the auxiliary magnets, auxiliary magnets having a different polarity than the main magnets are disposed between the main magnets in the columns.

As a result, the change in the magnetic field across the various rows is different from that across the various columns, so that also the forces that occur upon movement in a direction parallel to the rows are different from the forces that occur upon movement in a direction parallel to the columns. Because of the presence of the relatively weak auxiliary magnets, the difference between the magnetic forces of two adjacent rows is greater than the difference between the magnetic forces of two adjacent columns.

The rows and columns may be arranged in a x-y plane or in a cylindrical grid, in which case the rows or columns may extend in axial direction.

It is noted that in a moving device that is known from U.S. Pat. No. 5,952,744 B1, magnets are arranged in a cylindrical grid, in which the spacing between the magnets in circumferential direction is the same as the spacing between the magnets in axial direction. Seen in circumferential direction the magnets are arranged in rows and seen in axial direction the magnets are arranged in columns. Magnets in adjacent rows and in adjacent columns are oppositely polarised and staggered relative to each other. The second element is provided with first coils, which extend in circumferential direction. The first element is caused to move in axial direction by energizing the first coils. The second element is further provided with second coils, which extend in axial direction. The first element is caused to rotate in circumferential direction by energizing the second coils.

An advantage of such a moving device is that it is possible to execute a movement in two, preferably mutually perpendicular directions.

A limitation of the known moving device, however, is the fact that the same fluctuation of the magnetic field generated by the first element occurs both during said rotation and during said axial movement, as a result of which the same magnetic forces occur in circumferential direction as well as in axial direction.

One embodiment of the moving device according to the invention is characterised in that the first element is rotatable about an axis of rotation relative to the second element, with the columns extending parallel to the axis of rotation and the rows extending concentrically about the axis of rotation.

Because the concentrical rows are provided with auxiliary magnets of the same polarity disposed between the main magnets, a greater variation in the magnetic field is obtained upon movement in axial direction than upon movement in rotational direction. As a result, larger forces can be exerted in axial direction. In the situation in which the axial direction extends in vertical direction, this makes it possible to withstand the force of gravity, which is not necessary upon rotation in such a case.

Another embodiment of the moving device according to the invention is characterised in that in that the disc-shaped segments are soft-magnetic segments.

The array of segments and permanent magnets disposed therebetween leads to a simple structure of the first element.

Using permanent magnets of relatively simple design and specifically shaped segments, for example, it is possible to realise practically any desired configuration of main magnets and auxiliary magnets. The field lines from the permanent magnets pass through the segments and extend in radial direction from said segments.

Yet another embodiment of the moving device according to the invention is characterised in that each segment comprises at least two main magnets which are disposed closer to the coils of the second element than the auxiliary magnets disposed between the main magnets.

By positioning the auxiliary magnets at a greater distance from the coils than the main magnets, the forces that occur between the coils and the auxiliary magnets are smaller than the forces that occur between the coils and the main magnets. The auxiliary magnets and the main magnets may be made of the same magnetic material.

Yet another embodiment of the moving device according to the invention is characterised in that each segment comprises at least two main magnets which, seen in axial direction, have a thickness greater than that of the auxiliary magnets disposed between the main magnets.

Because of said greater thickness, the main magnet will generate a larger magnetic field than the auxiliary magnet.

The thicker main magnets of one segment are positioned opposite thinner auxiliary magnets of the other segment, so that a compact structure is obtained.

Yet another embodiment of the moving device according to the invention is characterised in that each permanent magnet has a uniform thickness.

As a result, a substantially constant magnetic field is led towards the segments by the permanent magnets.

Yet another embodiment of the moving device according to the invention is characterised in that the disc-shaped segments are permanent magnets which are polarised in a direction transversely to the axis of rotation.

The disc-shaped elements can be readily provided with stronger and weaker magnetic parts forming the main magnets and auxiliary magnets, respectively. The first element can be formed in a simple manner by stacking radially and axially polarised magnets alternately one on top of the other.

Yet another embodiment of the moving device according to the invention is characterised in that the disc-shaped segments are provided with two semicircular parts which are disposed on either side of a plane extending through the axis of rotation, which semicircular parts are polarised in opposite directions transversely to said plane.

Sides of the magnets located near said plane form the auxiliary magnets, whilst the sides spaced from said plane form the main magnets.

Such first disc-shaped segments are relatively easy to produce.

The invention also relates to a component placement device provided with such a moving device, wherein the first element is provided with an air passage extending in axial direction for generating an underpressure at one end in use for picking up a component.

Such a component placement device is suitable for picking up and placing components, for example on a substrate such as a PCB. The air passage preferably extends through the centres of the segments.

The invention will be explained in more detail with reference to the drawing, in which:

FIGS. 1A and 1B are a schematic developed view of a moving device according to the invention and a graph showing the magnetic flux during rotation, respectively;

FIGS. 2A and 2B are a schematic developed view of a moving device according to the invention and a graph showing the magnetic flux during translation, respectively;

Like elements are indicated by the same numerals in the figures.

Figure 4:
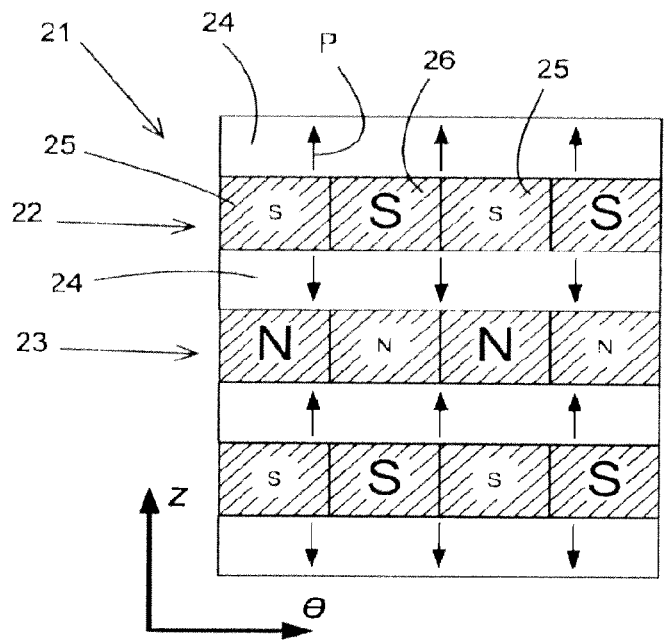
FIG. 4 is a schematic developed view of the first element shown in FIG. 3.

FIGS. 1A-2A show schematic developed views of a cylindrical grid 1 of a first element of a moving device according to the invention. The grid 1 comprises rows 2, 3 and columns 4, 5. The rows 2, 3 extend in circumferential direction θ, whilst the columns 4, 5 extend in Z-direction. The rows 2, 3 and the columns 4, 5 extend transversely to each other.

Each row 2 comprises alternately arranged main magnets 6 and auxiliary magnets 7, which are polarised in a direction transversely to the plane of the drawing, the north poles N, n of which magnets are shown in the figures. Rows 3 are located between the rows 2. Each row 3 comprises alternately arranged main magnets 8 and auxiliary magnets 9, which are polarised in a direction transversely to the plane of the drawing, the south poles Z, z of which magnets are shown in the figures. The rows 2, 3 are staggered relative to each other, so that an auxiliary magnet 9 of a row 3 located between the rows 2 is present in each column 4 between main magnets 6 of different rows 2. As a result, each column 4 is provided with alternately arranged main magnets 6 and auxiliary magnets 7, the poles N, z of which magnets are shown in the figures. Each column 5 is provided with alternately arranged auxiliary magnets 7 and main magnets 8, the poles n, Z of which magnets are shown in the figures. The auxiliary magnets 7, 9 are less strong than the main magnets 6, 8, so that the magnetic field provided by the auxiliary magnets 7, 9 is weaker.

The moving device further comprises a second element provided with a number of first elongated coils 10, which extend parallel to and opposite the columns 4, 5. Such a coil 10 is schematically shown in FIG. 1A. The second element is further provided with a number of second elongated coils it, which extend parallel to the rows 2, 3. Such a coil 11 is schematically shown in FIG. 2A.

In the graph of FIG. 1B the flux $\Phi_\theta$ is plotted against an angle of rotation θ of the first element relative to the second element. The rotation of the first element relative to the second element is effected by alternately energising the coils 10 in a manner which is known per se. By doing so, a column 4 and a column 5 are alternately positioned opposite the coil 10 shown in FIG. 1A. The flux $\Phi_\theta$ varies between a maximum value and a minimum value.

In the graph of FIG. 2B the flux $\Phi_z$ is plotted against a translation in the Z-direction of the first element relative to the second element. The translation of the first element relative to the second element is effected by alternately energising the coils 11 in a manner which is known per se. By doing so, a row 2 and a row 3 are alternately positioned opposite the coil 11 shown in FIG. 2A. The flux $\Phi_z$ varies between a maximum value and a minimum value.

Since each column 4, 5 comprises oppositely polarised main magnets and auxiliary magnets, whilst each row 2, 3 comprises main magnets and auxiliary magnets which are polarised in the same direction, the maximum flux $\Phi_\theta$ is smaller than the maximum flux $\Phi_z$.

Figure 3:
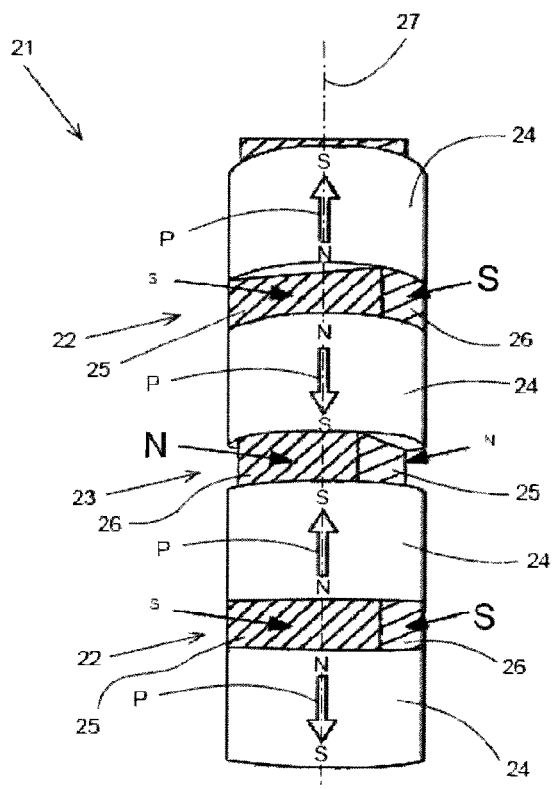
FIG. 3 is a perspective view of an embodiment of the first element of a moving device according to the invention.
Figure 5A:
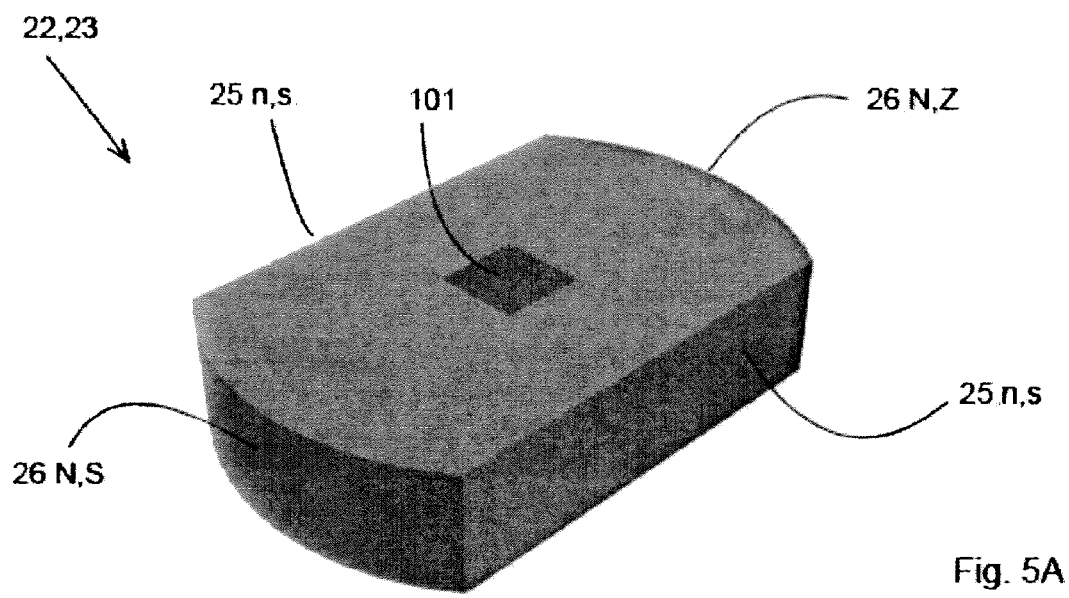
FIGS. 5A-5C are perspective views of other embodiments of segments for use in the first element shown in FIG. 3.

FIG. 3 is a perspective view of a first element 21 of a moving device according to the invention, which comprises a number of disc-shaped segments 22, 23 and permanent magnets 24 disposed between the segments 22, 23. FIG. 5A shows a perspective view of a segment 22, 23 made of a soft-magnetic material. As FIG. 5A clearly shows, each segment 22, 23 comprises a circular disc which is provided with flattened, straight edges 25 on two opposite sides. Located between said edges 25 are arcuate edges 26.

The first element 21 is elongate in shape and rotatable about an axis of rotation 27. Each permanent magnet 24 is polarised in a direction P parallel to the axis of rotation 27, with permanent magnets disposed on either side of a segment 22 being polarised in directions P away from each other and permanent magnets disposed on either side of a segment 23 being polarised in directions P toward each other. As a result, the segments 22 function as south poles z, Z and the segments 23 function as north poles n, N, with the magnetic field lines extending transversely to the axis of rotation 27 from the edges 25, 26. Since the segments 22, 23 have straight edges 25, which are located closer to the axis of rotation 27 and thus further away from the coils of the second element that surround the first element 21, the magnetic field of the edges 25 is weaker than that of the arcuate edges 26. The straight edges 25 form weaker auxiliary magnets having a pole n, z, whilst the arcuate edges 26 form main magnets having a pole N, Z. The segments 22 functioning as south poles are turned through 90 degrees about the axis of rotation relative to the segments 23 functioning as north poles, so that, seen in axial direction, auxiliary magnets of one polarity are disposed between main magnets of the other polarity. This is clearly shown in FIG. 4, which shows a developed view of the first element 21. The operation of a moving device provided with the first element 21 is comparable to that of the moving device described with reference to FIGS. 1A-2B.

Figure 5B:
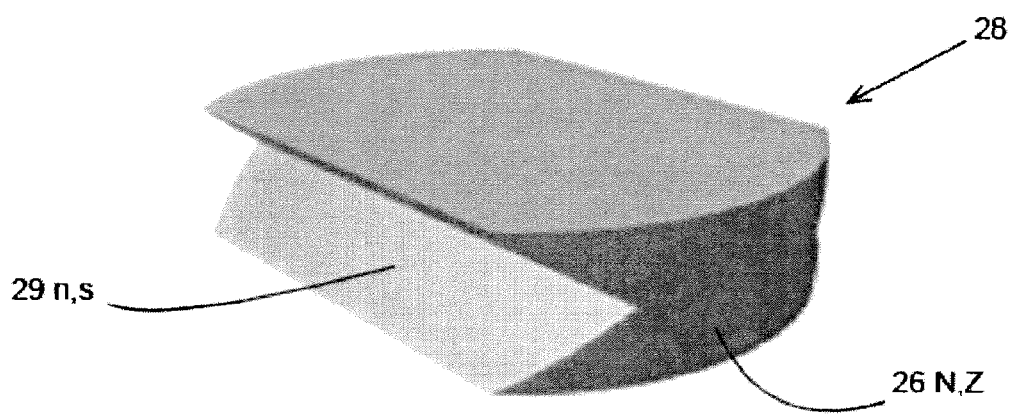
Figure 5C:
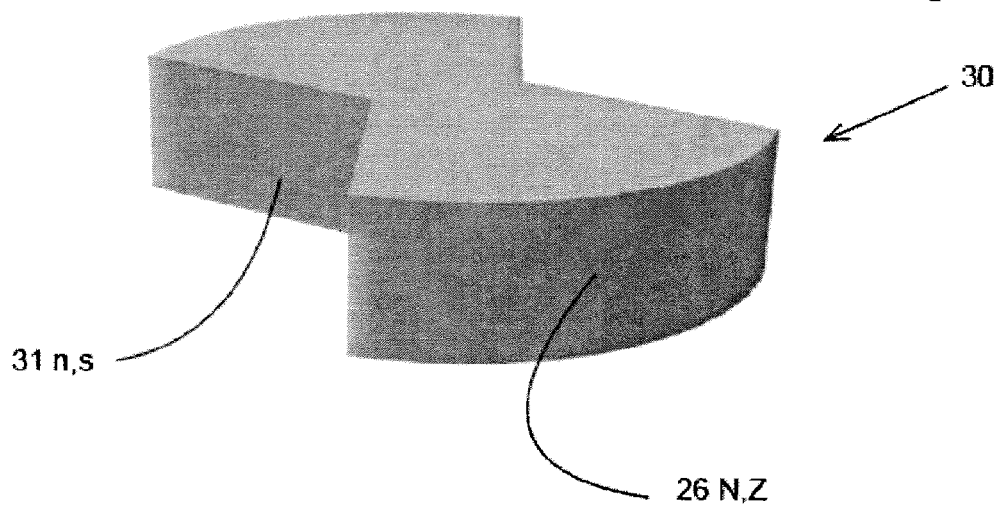

FIGS. 5B and 5C show alternative embodiments of the segments 22, 23, with the segment 28 shown in FIG. 5B exhibiting straight edges 29 forming a V-shaped indentation, which extend between the arcuate edges 26. The V-shape lies in a plane parallel to the axis of rotation. The segment 30 shown in FIG. 5C exhibits a V-shaped indentation 31 extending between the arcuate edges 26, which V-shape lies in a plane transversely to the axis of rotation. As a result of the different shapes, the magnetic lines will extend differently. The course of the magnetic flux upon rotation about the axis of rotation 27 and also upon translation in a direction parallel to the axis of rotation 27 can be determined by calculation or by experiment for each individual shape. A decrease of the difference in flux upon movement in one direction will result in an increase in the difference in flux and consequently an increase in the forces that occur upon movement in the other direction.

Figure 6:
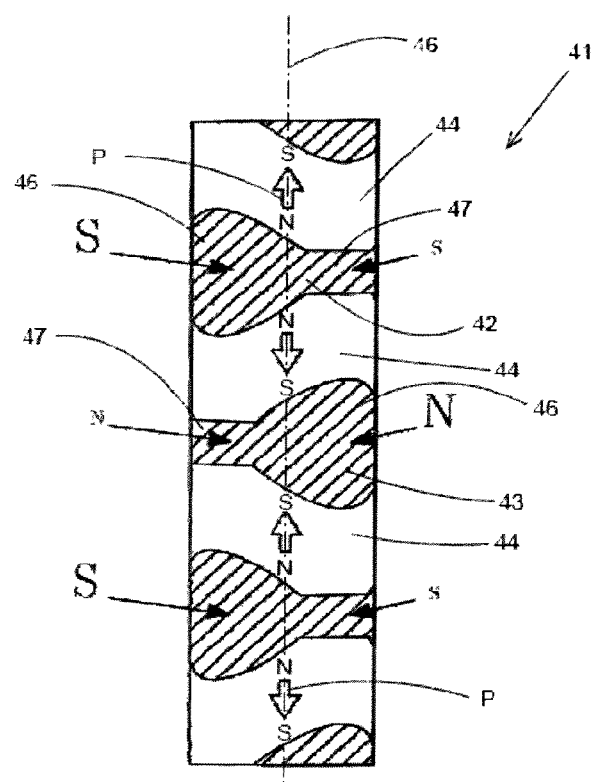
FIG. 6 is a front view of a first element of a moving device according to the invention.

FIG. 6 shows another embodiment of a first element 41 of a moving device according to the invention, which is provided with a number of disc-shaped segments 42, 43 and permanent magnets 44 disposed between the segments 42, 43. The segments 42, 43 are made of a soft-magnetic material. The first element 41 is elongate in shape and rotatable about an axis of rotation 45. Each segment 42, 43 is provided with two thicker (seen in axial direction) parts 46 and thinner parts 47 disposed between the thicker parts 46. The thicker parts 46 of the segments 42 are disposed opposite the thinner parts 47 of the segments 43, and conversely. As a result, the permanent magnets 4 disposed between the segments 42, 43 have a substantially constant thickness, seen in circumferential direction. Each permanent magnet 44 is polarised in a direction P extending parallel to the axis of rotation 45, with permanent magnets 44 disposed on either side of a segment 42 being polarised in directions P away from each other and permanent magnets 44 disposed on either side of a segment 43 being polarised in directions P toward each other. As a result, the segments 42 function as south poles Z and the segments 43 function as north poles N, with the magnetic field lines extending transversely to the axis of rotation 45 from the segments 42, 43. Since the magnetic field of the thicker parts 46 is stronger than that of the thinner parts 47, the thicker parts 46 of the segments form the main segments, whilst the thinner parts form the auxiliary magnets. Seen in axial direction, auxiliary magnets of one polarity are disposed between main magnets of the other polarity.

Figure 7A:
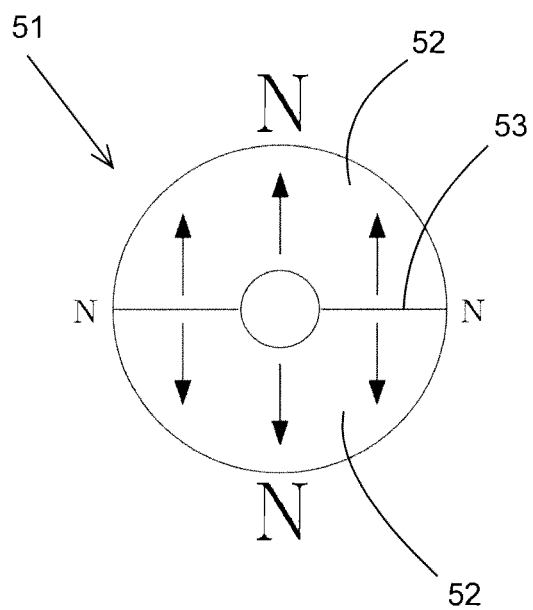
FIG. 7A-7B are cross-sectional views of another embodiment of magnets for a first element of a moving device according to the invention.
Figure 7B:
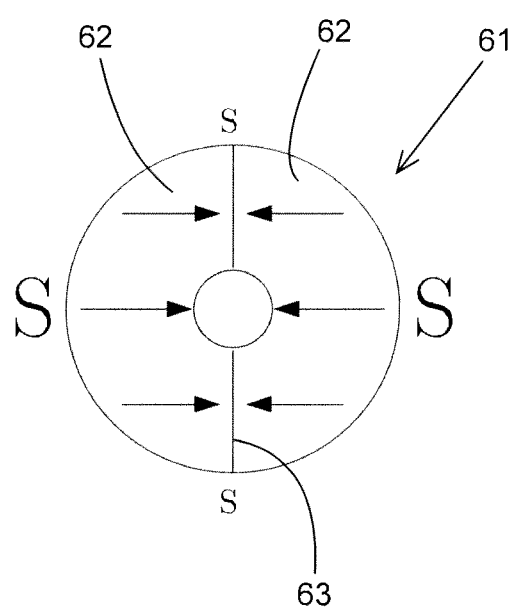

FIGS. 7A-7B show cross-sectional views of first disc-shaped permanent magnets 51, 61, which can be placed between axially polarised magnets 24 instead of the soft-magnetic segments 23 and 24, respectively. The magnets 24 form second disc-shaped permanent magnets. The permanent magnets 71, 81 each comprise two parts 52, 62. The magnetic polarisation is parallel in each of said parts 52, 62, so that the magnetic field lines extend parallel to each other. The magnetic field lines of the two parts 72, 82 connected across a joining face 53, 63 extend away from each and toward each other, respectively, as a result of which the magnetic field strength near the joining face 53, 63 is less and auxiliary magnets n, z are formed at that location, whilst the main magnets N, Z are spaced from the joining face 53, 63 by some distance. Each magnet 51 is disposed between two magnets 24 axially polarised in directions P toward each other, whilst the magnets 61 are disposed between two magnets 24 axially polarised in directions P away from each other.

Figure 8A:
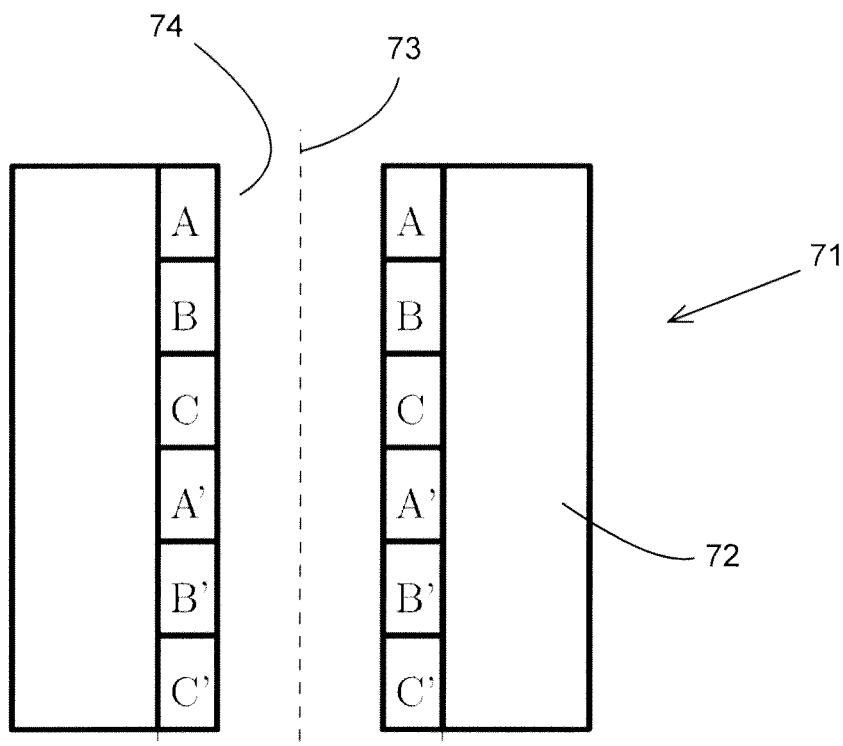
FIGS. 8A and 8B are longitudinal sectional view and a cross-sectional to view of a second element of the moving device according to the invention.
Figure 8B:
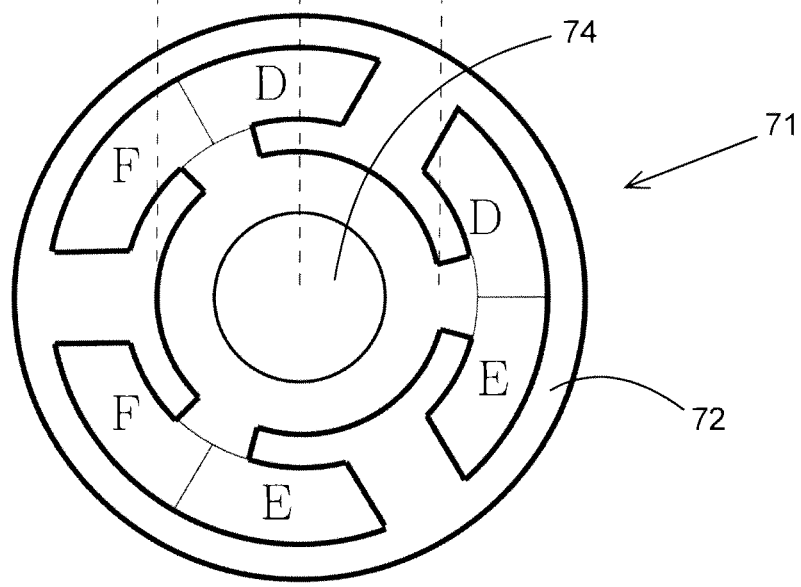

FIGS. 8A and 8B show a second element 71 of a moving device according to the invention, which second element 71 is provided with a tubular holder 72 that extends about a central axis 73. The holder 72 comprises a cylindrical passage 74, in which a first element as described above can be positioned. The holder 72 is provided with a number of ring-shaped coils A, B, C, A', B', C', which each extend about the central axis 73. Said coils A, B, C, A', B', C' function in the same manner as the coil 11 shown in FIG. 2A. The coils A, B, C, A', B', C' are energized in a staggered fashion according to a three-phase system, as a result of which a movement in a direction parallel to the central axis 73 is effected.

The holder 72 is further provided with a number of elongated coils D, E, F, which each extend in the axial direction of the cylindrical passage 74. The coils D, E, F function in the same manner as the coil to shown in FIG. 1A. The coils D, E, F are energized in a staggered fashion according to a three-phase system, as a result of which rotation about the central axis 73 is effected.

By energising the coils A, B, C, A', B', C' and the coils D, E, F simultaneously, a random helical motion can be realised.

The moving device according to the invention is suitable, for example, for use in a component placement device as known per se, with an elongated air passage tot (see FIG. 5A) extending through the first element for generating and underpressure near one end of the first element for picking up a component.

It is also possible to arrange the rows and columns at an angle other than 90 degrees relative to each other.

Although it is to be preferred for the magnetic field of the auxiliary magnets to be weaker than the magnetic field of the main magnets, it is also possible for the magnetic field of the auxiliary magnets to be stronger, for example in the situation in which the auxiliary magnets are provided between main magnets only in rows having one polarisation direction whilst no auxiliary magnets are provided in the rows having the other polarisation direction.

It is also possible to have the rows extend in axial direction.

It is also possible to form a moving device for realising movements in an x, y plane instead of movements about and parallel to the axis of rotation, in which case the rows will extend in the x-direction and the columns will extend in the y-direction. The forces to be exerted in the x-direction will in that case be smaller than the forces to be exerted in the y-direction.

It is also possible to use a stationary first element and to cause the second element to move relative to the first element.

The invention claimed is:

1. A moving device comprising at least a first element provided with main magnets and auxiliary magnets and a second element provided with coils,
   wherein the main magnets are arranged in a grid of rows and columns,
   wherein at least main magnets in adjacent rows are oppositely polarized and staggered relative to each other, while auxiliary magnets of the same polarity are disposed between the main magnets at least in a number of rows, wherein the strength of the magnetic field of said auxiliary magnets is different from that of the main magnets, wherein the coils can be energized for moving the first element relative to the second element in a direction parallel to the rows as well as in a direction parallel to the columns, wherein the first element is provided with a number of disc-shaped magnetic segments and permanent magnets disposed between said disc-shaped magnetic segments, wherein said permanent magnets located adjacent to each other are oppositely polarized in an axial direction, while said disc-shaped magnetic segments form the main magnets and the auxiliary magnets.

2. A moving device according to claim 1, wherein the first element is rotatable about an axis of rotation relative to the second element, with the columns extending parallel to the axis of rotation and the rows extending concentrically about the axis of rotation.

3. A moving device according to claim 2, wherein said disc-shaped magnetic segments are soft-magnetic segments.

4. A moving device according to claim 3, wherein each of said disc-shaped magnetic segments comprises at least two main magnets, wherein said at least two main magnets are disposed closer to the coils of the second element than the auxiliary magnets disposed between the main magnets.

5. A moving device according to claim 3 wherein each of said disc-shaped magnetic segments comprises at least two main magnets, wherein said at least two main magnets, seen in axial direction, have a thickness greater than that of the auxiliary magnets disposed between the main magnets.

6. A moving device according to claim 1, wherein each permanent magnet has a substantially uniform thickness.

7. A moving device according to claim 1, wherein said disc-shaped magnetic segments are permanent magnets, wherein said permanent magnets are polarized in a direction transversely to the axis of rotation.

8. A moving device according to claim 7, wherein said disc-shaped magnetic segments are provided with two semicircular parts, wherein said two semicircular parts are disposed on either side of a plane extending through the axis of rotation, wherein said semicircular parts are polarized in opposite directions transversely to said plane.

9. A component placement device provided with a moving device according to claim 1, wherein the first element is provided with an air passage extending in axial direction for generating an underpressure at one end in use for picking up a component.

* * * * *